May 19, 1931. R. S. CUNARD 1,805,717
DIRECTION SIGNAL FOR MOTOR VEHICLES
Filed March 25, 1930 2 Sheets-Sheet 1
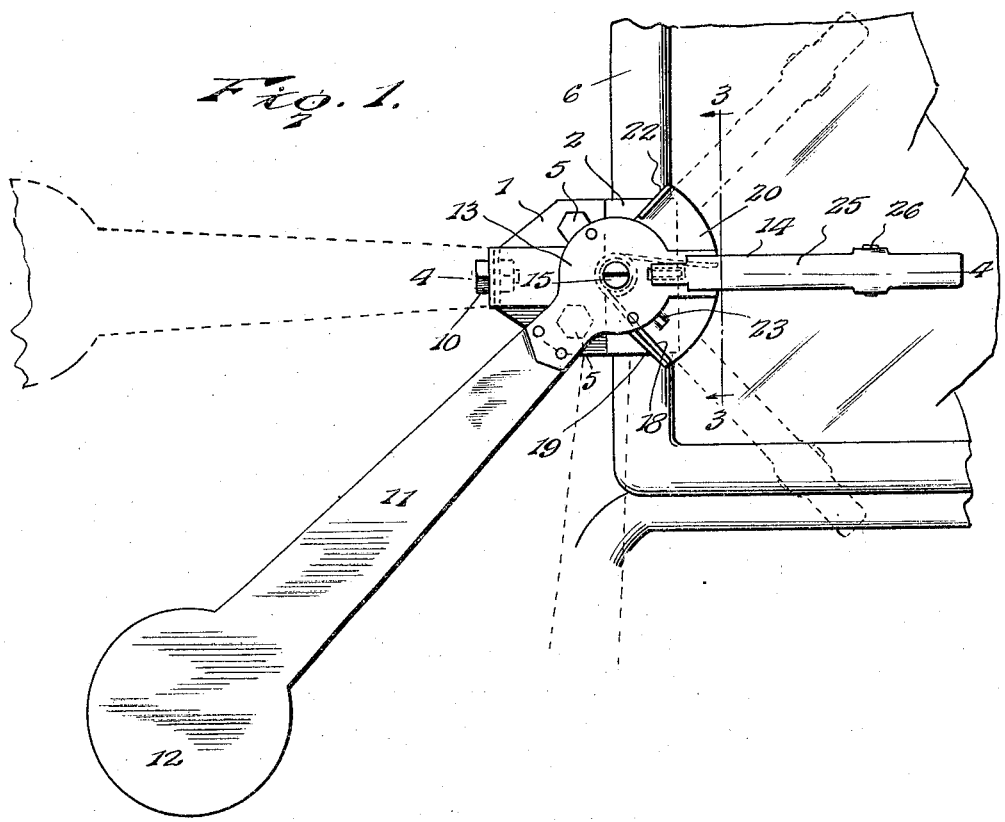
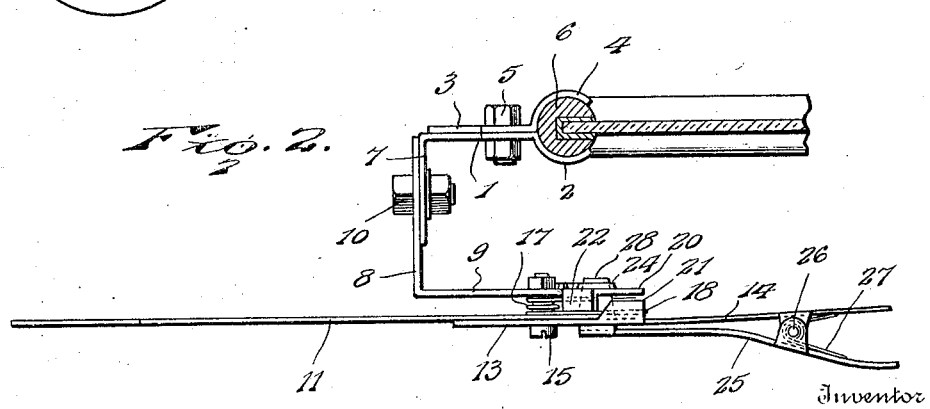

May 19, 1931.  R. S. CUNARD  1,805,717
DIRECTION SIGNAL FOR MOTOR VEHICLES
Filed March 25, 1930   2 Sheets-Sheet 2
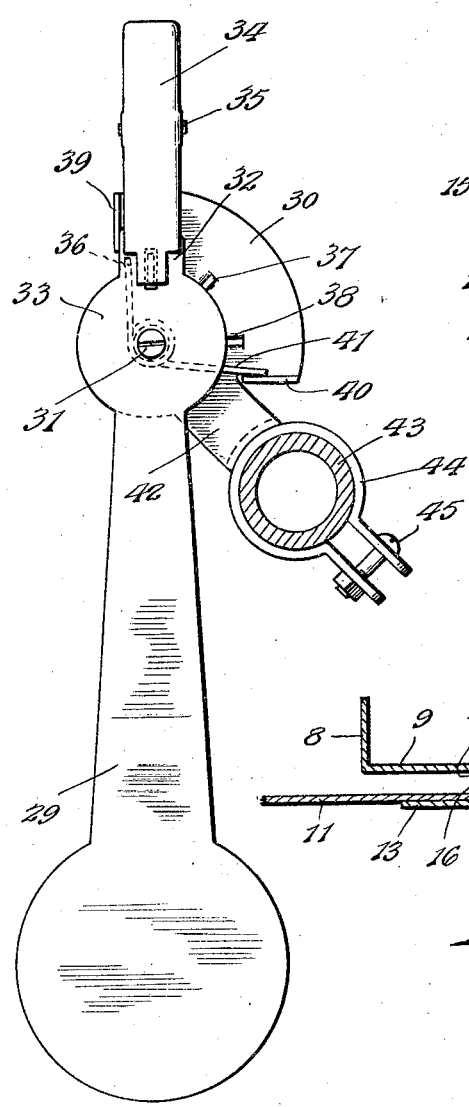
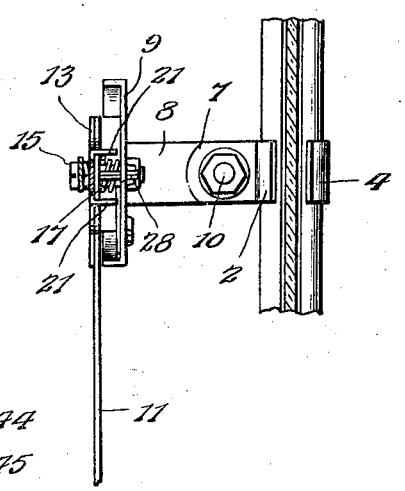
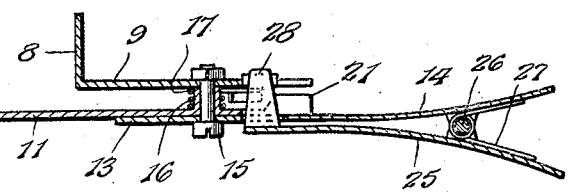
Inventor
R. S. Cunard.
By Lacey & Lacey, Attorneys Patented May 19, 1931

1,805,717

UNITED STATES PATENT OFFICE

RUSSELL S. CUNARD, OF EVERETT, PENNSYLVANIA

DIRECTION SIGNAL FOR MOTOR VEHICLES

Application filed March 25, 1930. Serial No. 438,866.

This invention relates to direction signals and more particularly to a signal adapted to be applied to a motor vehicle so that the operator thereof may indicate his intentions to the operators of other vehicles or to a traffic officer or persons crossing a street.

One object of the invention is to provide a signal which may be easily applied to an automobile of the open car type or motorcycle and including a semaphore arm normally held in a depending or neutral position but adapted to be swung upwardly towards a horizontal position in order to indicate the operator's intentions.

Another object of the invention is to provide improved means for pivotally mounting the semaphore arm and also improved means for securely but releasably holding the semaphore in a signaling position.

Another object of the invention is to provide a device of this character which is very simple in its construction and may be easily applied.

The invention is illustrated in the accompanying drawings, wherein

Figure 1 is a view in elevation showing the improved signal applied to the windshield of an automobile, Fig. 2 is a view showing the signal in top plan and the portion of the windshield to which it is attached in section, Fig. 3 is a sectional view taken on the line 3—3 of Fig. 1, Fig. 4 is a sectional view taken on the line 4—4 of Fig. 1, and Fig. 5 is a view in elevation of a modified form of signal for use upon the handle bar of a motorcycle.

The form of signal illustrated in Figures 1 through 4 is particularly adapted for use in connection with an automobile of the open type and includes a bracket 1 having a stationary jaw 2 carried thereby. A plate 3 carrying a companion jaw 4 is adjustably secured to the bracket 1 by bolts 5 so that the jaw 4 may be drawn towards the jaw 2 in order to grip the side bar 6 of a windshield frame between the jaws and firmly mount the signal at the driver's side of the automobile. The outer portion of the plate 1 is reduced to form an arm or tongue 7 which is bent to extend transversely of the plate and this arm is overlapped by an arm 8 extending from a bracket or plate 9. A bolt 10 is passed through the overlapped portions of the arms 7 and 8 in order to hold them together and by loosening this bolt the bracket or plate 9 may be adjusted after the side bar of the windshield has been gripped and thereby dispose the bracket 9 in a vertical position in case the side bar of the windshield extends at an incline. It will thus be seen that the signal may be very easily applied and adjusted after it has been set in place.

The semaphore arm 11 is formed of sheet metal and has its outer or free end enlarged, as shown at 12, to form a head to which an electric bulb or a reflector may be secured if so desired and the inner end portion of the semaphore arm has a reinforcing sheet or plate 13 riveted or otherwise firmly secured thereto. A lever 14 extends from the reinforcing plate radially of the upper end of the plate and at such angular relation to the semaphore arm that when the semaphore arm is extending downwardly in a neutral position close to the body portion of the automobile the lever will extend at an upward incline into the car so that it may be easily grasped. Registering openings are formed through the plate and inner end portion of the semaphore arm to receive a pivot pin or bolt 15 carried by the plate or bracket 9 and the semaphore arm is retained in spaced relation to its mounting plate or bracket by a spacing sleeve 16 about which is disposed a coiled spring 17 having arms 18 extending therefrom. One of the arms or extended portions of the spring bears against an abutment flange 19 at the lower end of the arcuate portion 20 of the bracket 9 and the other arm of the spring extends longitudinally of the lever between flanges 21 at opposite sides thereof and bears against the upper flange. It will thus be seen that this spring will normally retain the lever in a raised position with its upper side flange bearing against an abutment flange or tongue 22 at the upper end of the arcuate portion of the bracket but by grasping the lever and moving the same downwardly the semaphore arm may be swung upwardly from a depending neutral position in which it is disposed substantially vertically close to the side of the car body to a diagonal position, as shown in full lines in Figure 1, or a horizontal position, as indicated by dotted lines. Openings 23 are formed in the arcuate portion of the mounting plate or bracket by cutting tongues 24 therefrom and bending the tongues, as shown in Figures 1 and 2, and in order to releasably secure the semaphore in a partially or entirely raised position for signaling purposes, there has been provided a latch 25 pivoted to the lever, as shown at 26. This latch extends longitudinally of the lever and is engaged by a spring 27 which normally holds it in such position that, when the lever is grasped and swung downwardly to raise the semaphore arm, the bill 28 of the latch may enter the openings 23 and securely but releasably retain the semaphore arm in an adjusted position. By referring to Figures 1 and 2, it will be seen that the signal may be easily applied to the side bar of a windshield and when so mounted its lever will be positioned back of the windshield and may be very easily grasped by the operator of the automobile in order to swing the semaphore arm to a partially or entirely raised position for signaling purposes.

In Figure 5, there has been shown a modified form of signal particularly adapted for use in connection with a motorcycle. The semaphore arm 29 of this signal is similar in construction to the semaphore 11 and is pivotally connected with a bracket 30 by a bolt 31. A lever 32 extends from the head 33 at the inner end of the semaphore but instead of extending in diverging relation to the semaphore as shown in Figure 1, this lever is disposed in longitudinal alinement with the semaphore. A latch 34 corresponding to the latch 25 is pivoted to the lever, as shown at 35, and is provided with a tooth 36 corresponding to the tooth 28 and engageable in slots 37 and 38 formed in the bracket 30. Abutment tongues or flanges 39 and 40 are provided at the ends of the arcuate portion of the bracket 30 and the semaphore arm and its lever are normally retained in a vertical or neutral position by a spring 41 coiled about the bolt 31 between the semaphore arm and bracket with its arms extending from the bolt. One arm of the spring bears against the lower flange or tongue 40 and its other arm engages a side arm formed upon the lever and corresponding to the side arms or tongues 21 of the lever 14. An arm 42 extends from the bracket and is bent to project transversely thereof. By this arrangement the bracket may be disposed in a substantially vertical position with the arm 40 extending longitudinally of a handle bar 43 of a motorcycle and the clamp 44 carried by the arm engaged about the motorcycle handle and firmly secured thereto by tightening its bolt 45. Therefore, the signal will be mounted in a convenient position and when the operator of the motorcycle intends to make a turn the lever and latch may be grasped and the semaphore arm swung outwardly and upwardly to either a diagonal or horizontal position. A partially raised position may indicate a right turn and a horizontal position a left turn or the partially raised position may merely indicate that a turn is to be made and the horizontal position indicate that the motorcycle is going to stop.

Having thus described the invention, I claim:

1. A direction signal for vehicles comprising a bracket adapted to be secured to a support, a semaphore arm having a lever at its inner end, a pin to pivotally mount said semaphore carried by said bracket and extending through the inner end portion of the semaphore, the bracket being formed with sockets spaced transversely from each other, abutments carried by said bracket with the sockets disposed between the same, a spring engaging said lever and one abutment to yieldably resist upward swinging of the semaphore, and a latch carried by said lever and engageable in said sockets to releasably secure the semaphore in a set position.

2. A direction signal for vehicles comprising a bracket adapted to be secured to a support, a semaphore arm having a lever at its inner end, a pin to pivotally mount said semaphore carried by said bracket and extending through the inner end portion of the semaphore, the bracket being formed with sockets spaced transversely from each other, abutments carried by said bracket with the sockets disposed between the same, abutments extending from said lever towards said bracket, a spring coiled about said pin and having arms extending from the pin, one spring arm bearing against an abutment of the bracket and the other spring arm extending between the abutments of said lever and engaging one to urge the semaphore towards a neutral position, and a latch carried by said lever and engageable in said sockets to releasably secure the semaphore in a set position.

3. A direction signal for vehicles comprising a bracket, a clamp to secure said bracket to a support, a semaphore arm, a reinforcing plate permanently secured against the outer face of the upper portion of said semaphore and having an arm extending from the semaphore and constituting an actuating lever, a pin carried by said bracket and extending through registering openings in the semaphore and plate to pivotally mount the semaphore, a spacing sleeve about said pin holding the semaphore and bracket, a strand of resilient wire coiled about said sleeve between the semaphore and bracket and having end portions extending therefrom and engaging said bracket and lever to yieldably resist movement of the semaphore towards a signaling position, abutments carried by the bracket for engagement by said lever to limit swinging movement of the semaphore, and a latch carried by said lever and engageable with the bracket to releasably secure the semaphore in a set position.

4. A direction signal for vehicles comprising a bracket, a clamp to secure said bracket to a support, a semaphore arm having a lever at its inner end, a pin to pivotally mount said semaphore carried by said bracket and extending through the inner end portion of the semaphore, the bracket being pivotally connected with said clamp whereby the semaphore may be set vertically after the clamp is engaged with the support, abutments projecting from said bracket, abutments projecting from sides of said lever to engage the abutments of the bracket and limit swinging movement of the lever and semaphore, the bracket being formed with sockets, between its abutments and a latch carried by said lever to engage in said sockets and retain the semaphore in a set position.

In testimony whereof I affix my signature.

RUSSELL S. CUNARD. [L. S.]